Sept. 20, 1932.   L. G. COPEMAN   1,878,759
METHOD AND APPARATUS FOR FREEZING LIQUIDS
Filed Aug. 18, 1930   2 Sheets-Sheet 1
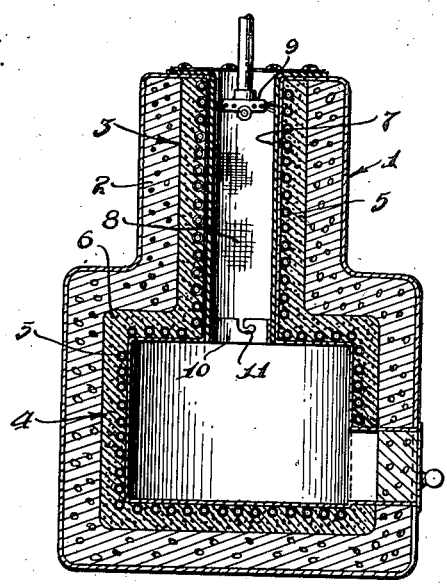
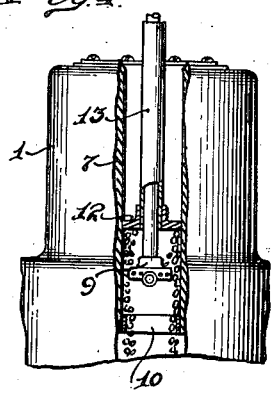
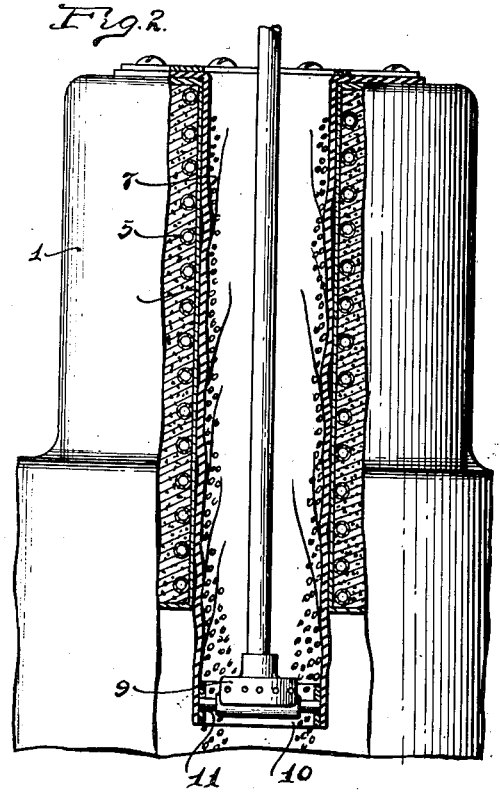
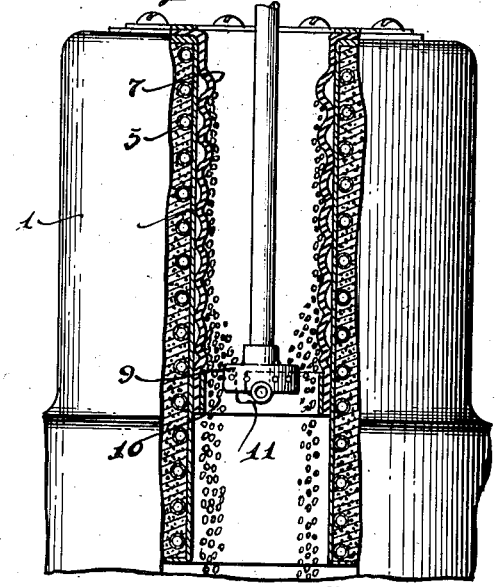
INVENTOR.
LLOYD G. COPEMAN.
BY
Barnes & Kisselle
ATTORNEYS

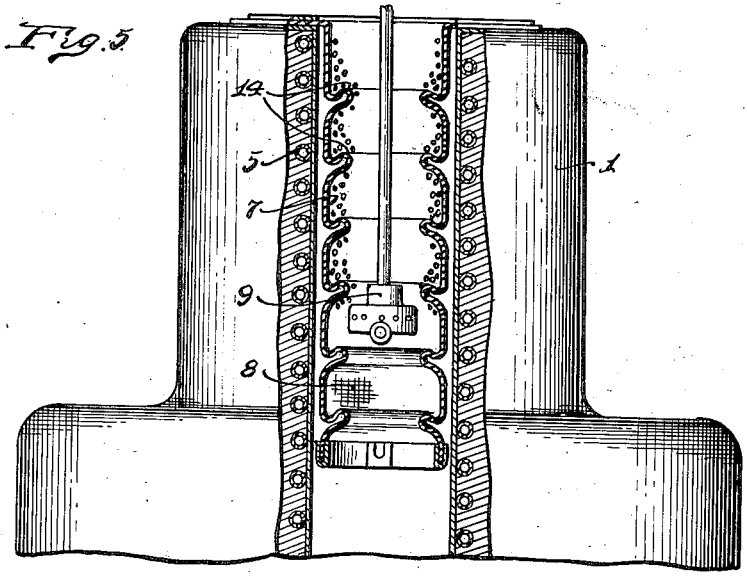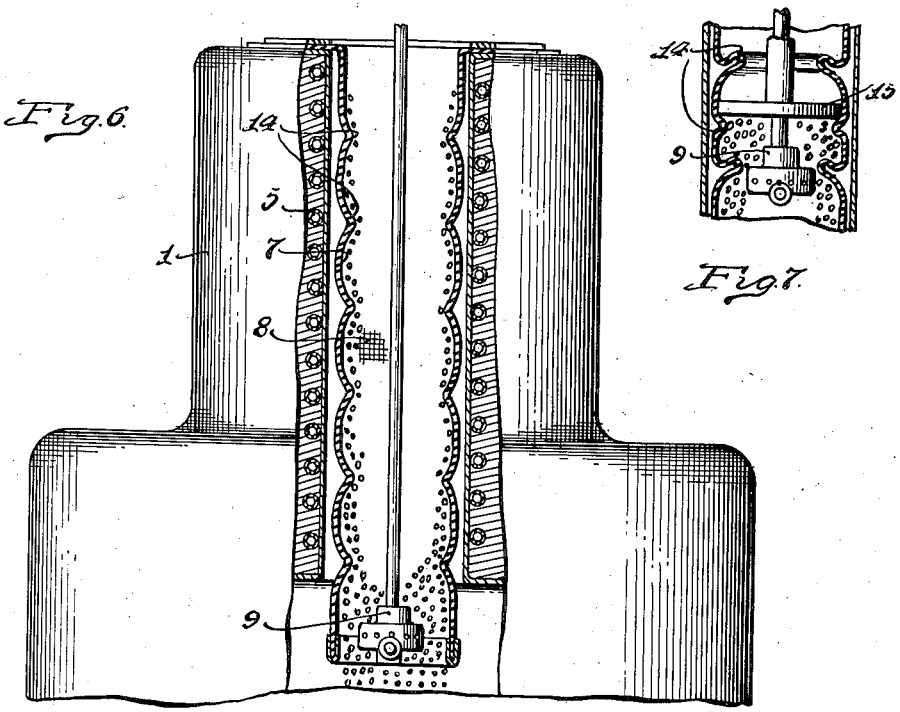

Patented Sept. 20, 1932

1,878,759

UNITED STATES PATENT OFFICE

LLOYD G. COPEMAN, OF FLINT, MICHIGAN, ASSIGNOR TO COPEMAN LABORATORIES COMPANY, OF FLINT, MICHIGAN, A CORPORATION OF MICHIGAN

METHOD AND APPARATUS FOR FREEZING LIQUIDS

Application filed August 18, 1930. Serial No. 475,944.

This invention relates to method and apparatus for freezing liquids and has to do particularly with a novel device for automatically forming ice designed to simulate or take the place of cracked or shaved ice.

In spite of the recent and widespread adaptation of refrigerating machinery for the manufacture of ice cubes, there is still a great demand for fine or cracked ice and it has hitherto been necessary to obtain this fine ice by crushing or otherwise breaking down large blocks of ice or the manufactured ice cubes.

It is the object of the present invention to provide means for directly and automatically obtaining and storing finely divided particles of ice similar to crushed ice. The main method by which this is carried out is by spraying or otherwise depositing the liquid upon a refrigerated deformable surface such as rubber and then distorting or otherwise actuating the surface thereof to remove the particles of ice when frozen. The device is preferably arranged whereby the small particles of ice when formed are automatically received in a suitable bunker.

In the drawings:

Fig. 1 illustrates one embodiment for carrying out my invention and showing in particular the manner of spraying the liquid upon the deformable walls of a sharp freezing chamber.

Fig. 2 illustrates one manner of dislodging the frozen ice particles by longitudinally stretching the distortable member upon which the ice particles are formed.

Fig. 3 illustrates a further possible step in dislodging the ice particles wherein the distortable member is compressed.

Fig. 4 illustrates a modified manner of dislodging the particles of ice.

Fig. 5 illustrates a further modified method of forming and dislodging the particles of ice wherein the walls of the deformable member are corrugated to form small pockets.

Fig. 6 is a view similar to Fig. 5 illustrating one manner of distorting the pockets to eject and remove the particles of ice.

Fig. 7 is a fragmentary view illustrating a modified manner of removing the particles of ice from the pockets, such as shown in Fig. 5, by direct distortion of the corrugations or pockets.

It will be understood that various forms of apparatus may be used in carrying out the present invention. This is particularly so in view of the fact that the main feature of the invention is the provision of a distortable surface or wall upon which the drops of liquid may initially congeal to form the small particles of ice.

One form of apparatus for carrying out the invention is illustrated in Figs. 1 to 3 wherein I have shown a substantially cylindrical cabinet 1 which may be provided with a suitable insulating wall 2 and a sharp freezing chamber which may be divided into an upper part 3 and a lower part 4. This sharp freezing chamber may be formed by embedding suitable refrigerant coils 5 in a wall 6 of stone or similar material acting as a "hold-over".

The upper part 3 of the sharp freezing chamber is preferably cylindrical in form and the lower part 4 may be cylindrical or otherwise shaped, the main point being that the lower part 4 serves as a bunker or storage receptacle for maintaining the shape of small particles of ice.

Suitably positioned within the upper portion 3 of the sharp freezing chamber is a sleeve 7 which may be formed of a good grade of thin rubber or suitable material, to which ice will not readily adhere. This sleeve is preferably positioned closely adjacent the inner wall of the sharp freezing chamber and, of course, such upper portion 3 of the sharp freezing chamber is preferably maintained at a relatively low temperature. If desired, this sleeve or similar article 7 may be formed so as to have a plurality of small divisions or pockets 8 moulded into the surface thereof to assist in shaping the small ice particles.

Any suitable means may be utilized for depositing or spraying water upon the surfaces of such sleeve 7, and I have shown one means for doing this in the form of a spray head 9 which may be moved axially of the sleeve 7 and which is provided with a plurality of apertures for spraying a thin film of liquid on the walls of the sleeve 7.

As the walls 7 are preferably maintained relatively cold, it will be obvious that the thin film of liquid will congeal on the surfaces thereof almost immediately upon striking the same. As the liquid is deposited and frozen upon the surfaces of the sleeve 7, the head 9 may be gradually lowered so that a thin layer of ice particles is formed on the surfaces of the sleeve or in the pockets or indentations 8 as the case may be.

The lower portion of the sleeve 7 is preferably provided with a collar 10 and this collar includes a suitable bayonet slot 11 for the reception of a pin 12 forming a part of the head 9. As the head 9 lowers, the pin 12 preferably engages the bayonet slot 11 and continued movement of the head 9 will obviously tend to distort and stretch the sleeve 7 if the same is formed of resilient material such as rubber. As ice will not readily adhere to rubber it will be obvious that material distortion thereof will serve to dislodge the thin film or small particles of ice formed on the sleeve and these small particles of ice will drop down into the bunker 4, where the relatively low temperature maintained therein will preserve the small particles of ice in the form in which they are deposited in the bunker.

It will be obvious that the rubber sleeve may assume different forms and may be distorted in different ways and by different means. As shown in Fig. 2 the head 9 has preferably engaged the bayonet slot of the collar 10 and is stretching the rubber sleeve 7 downwardly and at the same time twisting the same. The extent of the distortion and twisting action will, of course, vary under different operating conditions.

In Fig. 3 I have shown the header 9 as being moved upwardly so as to collapse the sleeve 7 in the manner shown. The purpose of this action is to dislodge any particles of ice not dislodged by the stretching and twisting action. In some cases, it might be found desirable to dislodge the particles of ice by the collapsing action alone.

In Fig. 4, I have illustrated a modified manner of carrying out the invention wherein the sleeve 7 is more or less fixed and the small particles of ice are scraped from the walls of the sleeve by a flexible piston 12.

This piston may be formed as a part of a sleeve 13 and may be actuated manually or automatically as desired. It will be obvious that the piston 12 may be moved downwardly after the head 9 has sprayed the entire surface of the sleeve 7 or if the freezing is fast enough, it may be moved a slight distance back of the head in the downward descent thereof. This piston 12 is preferably formed of rubber but may be formed of other materials as desired.

In Figs. 5, 6, and 7 I have shown a modified manner of constructing the rubber sleeve. In this case the rubber sleeve is preferably corrugated as at 14 so that small pockets are formed to collect and prevent the water from running down and thus hold it in contact with the sleeve long enough to permit congealing of the same. This corrugated tube may also be provided with the small indentations 8 to assist in forming the small particles of ice. In an installation of this kind, it will be obvious that the temperature of the unit may be maintained somewhat higher. In Fig. 6 I have shown the corrugated tube as being stretched in much the same manner as illustrated in Fig. 2, thus releasing the small particles of ice and allowing them to drop to the bunker below. In Fig. 7 I have illustrated the use of a piston 15 in distorting the corrugations 14 to remove the particles of ice in much the same manner as shown in Fig. 4.

It will be understood that I am not limited to the use of rubber in the fabrication of the sleeve 7 or of the piston 12, but that such unit may be made of various materials which can be lowered to such temperature that water will congeal and freeze thereon, and can be removed by scraping and/or distortion.

What I claim is:

1. The method of forming small particles of ice which comprises maintaining a wall at temperatures below freezing, applying the liquid to be frozen in a relatively thin film whereby it will congeal on the surface or surfaces of said wall and then distorting said wall in the direction of its length to remove the frozen particles of ice.

2. The method of forming small particles of ice which consists in maintaining a suitable surface at a temperature below freezing, spraying a thin film of liquid on said surface whereby the same will congeal thereon and then removing the congealed liquid from said surface in the form of small particles of ice by inherently distorting the said surface.

3. The method of forming and storing small particles of ice which comprises positioning a vertical ice forming surface above a bunker, maintaining said surface and said bunker at a temperature at/or below freezing, applying a small amount of liquid to said surface whereby the same will congeal thereon in small particles or a thin film and then removing said ice from said surface in the form of small particles which drop into said bunker by inherently distorting the said surface.

4. The method of forming small particles of ice which consists in bringing a vertical surface formed of distortable material to a temperature below freezing, applying the liquid to be frozen to said surface as a thin film and then distorting said surface by stretching it whereby the small particles of ice will dislodge therefrom.

5. The method of forming small particles of ice which comprises applying a thin film of liquid to a surface having horizontal ridges maintained at a temperature below freezing, allowing said liquid to congeal and to form a thin film of ice and then removing said thin film of ice from the said surface in the form of small particles of ice by distorting the said surface in the direction of its length.

6. The method of forming small particles of ice which comprises applying a thin film of liquid to a surface formed of distortable material and maintained at a temperature below freezing sufficient to cause said liquid to instantly congeal and to form a thin film of ice and then removing said thin film of ice from the said surface by stretching and twisting the said surface.

7. A sharp freezing unit for forming small particles of ice comprising a cooling unit, a wall of distortable material positioned adjacent the surface or surfaces of said cooling unit, means for depositing the liquid to be frozen on the surfaces of said wall and means for distorting said wall in the direction of its length to automatically dislodge the ice therefrom in small particles.

8. A sharp freezing unit for forming small particles of ice comprising a cooling unit, a wall of distortable material positioned adjacent the surface or surfaces of said cooling unit a portion thereof being stationarily secured, means for depositing the liquid to be frozen on the surfaces of said wall, means for distorting said wall to automatically dislodge the ice therefrom in small particles and a storage compartment formed in the bottom of said unit and so positioned beneath said wall whereby the particles of dislodged ice will fall directly thereinto.

9. A sharp freezing and storage unit of the class described comprising an upper chamber surrounded by refrigerating means, a vertical wall of flexible material supported within said chamber and positioned adjacent the walls thereof, means for covering the surface of said wall with a thin film of liquid whereby the same will congeal to the said wall as a thin film of ice, means for dislodging the ice from said wall by stretching the said wall and means for receiving and storing said dislodged particles of ice.

10. A sharp freezing unit for manufacturing small particles of ice comprising a substantially cylindrical cooling unit, a distortable sleeve supported interiorly of the said unit and positioned adjacent the walls thereof whereby said sleeve will be cooled to a point below freezing by said cooling unit, means for applying a thin film of water to the walls of said sleeve whereby the same will congeal thereon in the form of ice and means for distorting said sleeve to dislodge the particles of ice therefrom.

11. A sharp freezing unit for manufacturing small particles of ice comprising a substantially cylindrical cooling unit, a distortable rubber sleeve supported interiorly of the said unit and positioned adjacent the walls thereof whereby said rubber sleeve will be cooled to a point below freezing by said cooling unit, means for applying a thin film of water to the walls of said rubber sleeve whereby the same will congeal thereon in the form of ice and means for distorting said rubber sleeve to dislodge the particles of ice therefrom.

12. A sharp freezing unit for manufacturing small particles of ice comprising a substantially cylindrical cooling unit, a distortable sleeve of a material to which ice does not readily adhere supported interiorly of the said unit and positioned adjacent the walls thereof whereby said sleeve will be cooled to a point below freezing by said cooling unit, means for applying a thin film of water to the walls of said sleeve whereby the same will congeal thereon in the form of ice and means for distorting said sleeve to dislodge the particles of ice therefrom.

In testimony whereof I have affixed my signature.

LLOYD G. COPEMAN.